US012098964B2

(12) United States Patent
Finlinson et al.

(10) Patent No.: US 12,098,964 B2
(45) Date of Patent: Sep. 24, 2024

(54) RESISTIVE HOTSPOT TEMPERATURE SENSOR

(71) Applicant: Apple Inc., Cupertino, CA (US)

(72) Inventors: Craig P. Finlinson, Solana Beach, CA (US); Weibiao Zhang, Saratoga, CA (US); Tao Zeng, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 17/485,125

(22) Filed: Sep. 24, 2021

(65) Prior Publication Data

US 2023/0101044 A1 Mar. 30, 2023

(51) Int. Cl.
*G01K 7/21* (2006.01)
*G01K 15/00* (2006.01)

(52) U.S. Cl.
CPC .............. *G01K 7/21* (2013.01); *G01K 15/005* (2013.01)

(58) Field of Classification Search
CPC ................................ G01K 7/21; G01K 15/005
See application file for complete search history.

(56) References Cited

U.S. PATENT DOCUMENTS

| | | | |
|---|---|---|---|
| 5,795,069 A * | 8/1998 | Mattes | G01K 7/25 374/E7.027 |
| 6,281,760 B1 | 8/2001 | Knelling et al. | |
| 7,315,792 B2 * | 1/2008 | Min | G11C 29/50016 327/512 |
| 8,598,681 B2 | 12/2013 | Le Neel et al. | |
| 9,689,824 B2 | 6/2017 | Le Neel et al. | |
| 10,094,797 B2 | 10/2018 | Le Neel et al. | |

OTHER PUBLICATIONS

Alexey Dudarev, Johan Bremer, Tim Mulder, Matthias Mentink, Jeroen ter Harmsel, and Herman H. J. ten Kate, New Bridge Temperature Sensor for Superconducting Magnets and Other Cryogenic Applications, IEEE Transactions On Applied Superconductivity, vol. 28, No. 3, Apr. 2018 9000904, Downloaded on Jun. 23, 2021 at 16:39:56 UTC from IEEE Xplore. 4 pages.

(Continued)

*Primary Examiner* — Randy W Gibson
(74) *Attorney, Agent, or Firm* — Kowert, Hood, Munyon, Rankin & Goetzel, P.C.; Gareth M. Sampson; Dean M. Munyon

(57) ABSTRACT

Various techniques for implementing resistive temperature sensors that rely on the resistors' temperature sensitivity to provide temperature sensing are disclosed. Temperature sensitive resistors may be implemented in a resistor stack in combination with a resistor stack of resistors that are relatively temperature indifferent. Various temperature sensor circuits implementing these temperature sensitive resistors are also disclosed. A temperature sensor circuit may implement the temperature sensitive resistors along with the resistors that are relatively stable with temperature to output a voltage signal that is indicative of the temperature sensed by the circuit. In some instances, the signal from the temperature sensitive resistors is increased through the use of a feedback resistor loop.

20 Claims, 9 Drawing Sheets

(56) References Cited

OTHER PUBLICATIONS

Souha Hacine, Frédérick Mailly, Laurent Latorre, Pascal Nouet, Study of a High-Resolution and Low-Power CMOS Temperature Sensor, University Montpellier 2 / CNRS, LIRMM, Microelectronic Department 161, rue Ada, 34095 Montpellier Cedex 5, France, latorre@lirmm.fr, 4 pages, 978-1-4673-0859-5/12/$31.00 @2012 IEEE Downloaded on Jun. 24, 2021 at 20:28:01 UTC from IEEE Xplore.

Pan, Sining; Makinwa, Kofi A.A., A CMOS Resistor-Based Temperature Sensor with a 10fJ.K2 Resolution FoM and 0.4° C. (30) Inaccuracy from -55° C. to 125° C. after a 1-point Trim DOI 10.1109/ISSCC19947.2020.9063064, Publication date 2020 Document Version Accepted author manuscript Published in 2020 IEEE International Solid-State Circuits Conference, ISSCC 2020, 4 pages.

Sining Pan, Student Member, IEEE, and Kofi A. A. Makinwa, A 10 fJ-K2 Wheatstone Bridge Temperature Sensor With a Tail-Resistor-Linearized OTA, IEEE Journal of Solid-State Circuits, Fellow, IEEE, 10 pages, Downloaded on Sep. 4, 2020 at 13:42:41 UTC from IEEE Xplore.

\* cited by examiner

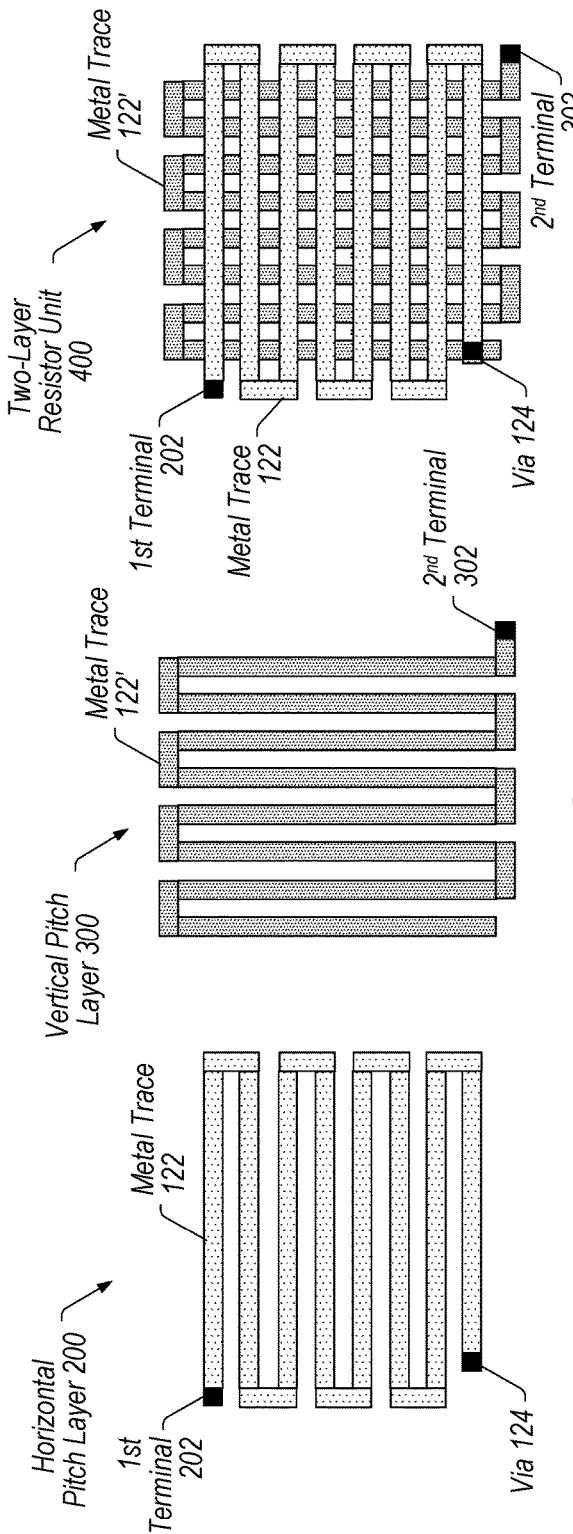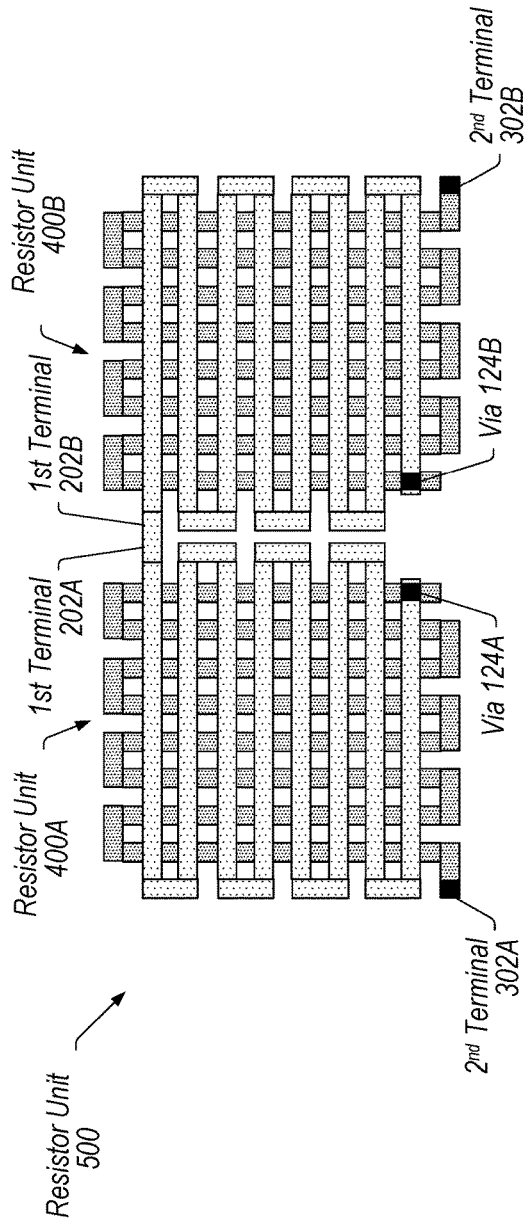

1100 ─╮

```
┌─────────────────────────────────────────────────────────┐
│ Assessing, by a temperature sensor circuit positioned   │
│ in the integrated circuit device, a differential        │
│ between a first voltage across a first resistor stack   │
│ and a second voltage across a second resistor stack     │
│                        1102                             │
└─────────────────────────────────────────────────────────┘
                             │
                             ▼
┌─────────────────────────────────────────────────────────┐
│ Providing, by the temperature sensor circuit, a voltage │
│ signal output corresponding to the assessed differential│
│                        1104                             │
└─────────────────────────────────────────────────────────┘
                             │
                             ▼
┌─────────────────────────────────────────────────────────┐
│ Determining a temperature of the integrated circuit     │
│ device based on the voltage signal output               │
│                        1106                             │
└─────────────────────────────────────────────────────────┘
```

FIG. 11

RESISTIVE HOTSPOT TEMPERATURE SENSOR

BACKGROUND

Technical Field

Embodiments described herein relate to temperature sensors for electronic circuits. More particularly, embodiments described herein relate to resistive temperature sensor structures and resistive temperature sensor circuits.

Description of the Related Art

As features sizes have decreased, the number of transistors on integrated circuits (ICs) has correspondingly increased. The increased number of transistors per unit area has resulted in a corresponding increase in power per unit area and, accordingly, thermal output (heat generation) of ICs. This trend has occurred despite the fact that the increased number of transistors per unit area has also corresponded to a decrease in the supply voltages provided to various functional circuitry on an IC. These trends have in turn led to significant challenges in balancing performance, power consumption, and thermal output of ICs. To this end, many ICs implement subsystems that monitor various metrics of the IC (e.g., temperature, voltage, voltage drops) and adjust the performance of the IC based on received measurements from these subsystems. Temperature is one metric that is commonly monitored for various reasons. Accordingly, an IC may have temperature sensors implemented thereon (e.g., within certain functional circuit blocks). Such temperature sensors may provide temperature readings to other circuits that carry out various control functions, such as adjusting voltages, clock frequencies, and/or workloads of various functional circuit blocks based on their respectively reported temperatures.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 2 depicts a top-view representation of an embodiment of a horizontal pitch layer of a metal trace.

FIG. 3 depicts a top-view representation of an embodiment of a vertical pitch layer of a metal trace.

FIG. 4 depicts a top-view representation of an embodiment of a two-layer resistor unit.

FIG. 5 depicts a top view-representation of an embodiment of a resistor unit.

FIG. 11 is a flow diagram illustrating a method for determining a temperature of an integrated device, according to some embodiments.

Figure 1:
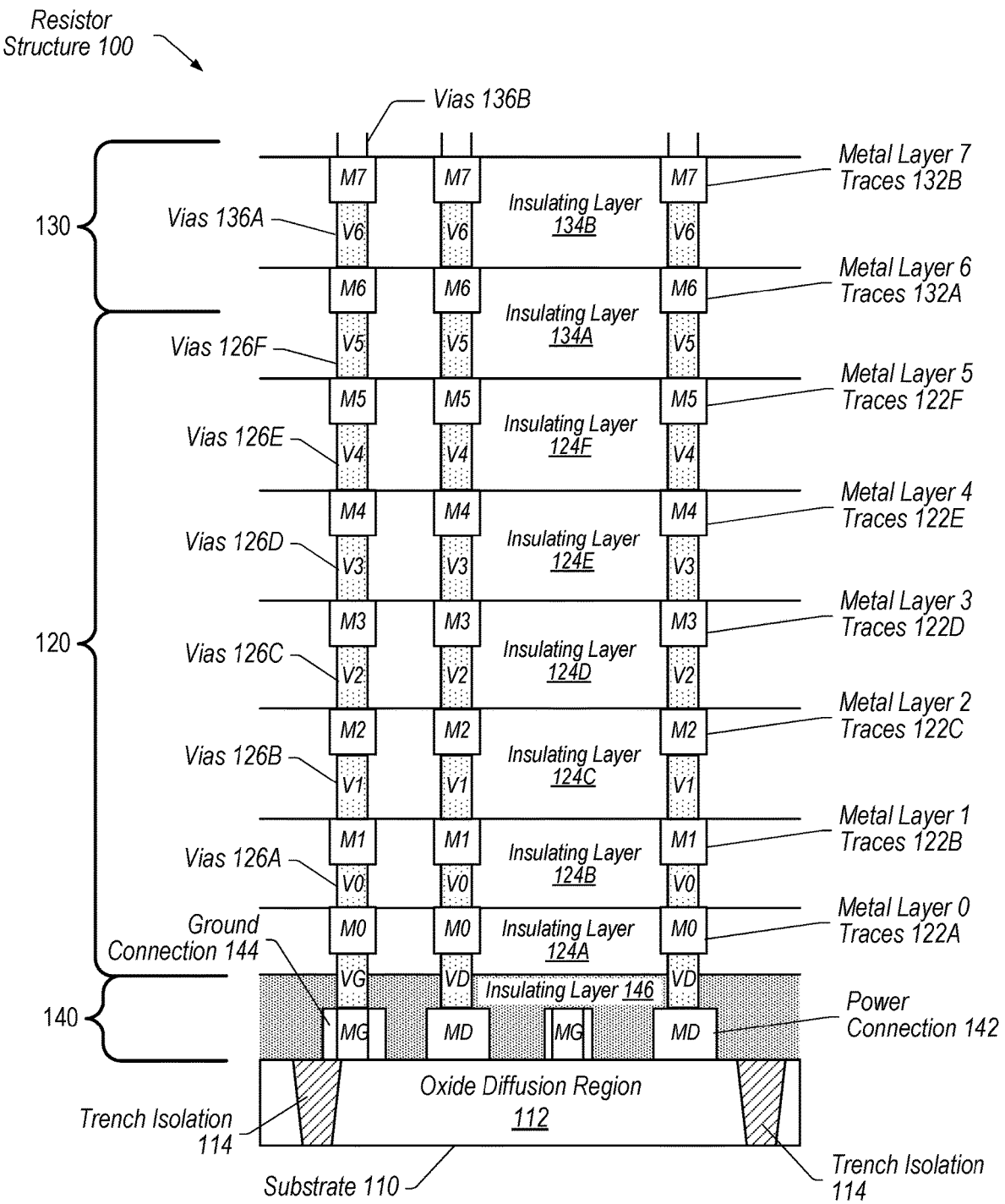
FIG. 1 depicts a cross-sectional representation of an embodiment of a resistor structure.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to resistive temperature sensors usable in integrated circuits. As features sizes of devices on integrated circuits have become smaller, the density of circuitry has correspondingly increased. Increased density of circuitry can result in higher density power consumption, and thus, faster temperature rises in "hotspots" (e.g., high activity portions of the IC) occurring during operation of an integrated circuit. Furthermore, these hotspots may be more localized due to the increased circuit density. Thus, implementing sensing circuitry (e.g., temperature sensors) within these high-density circuits has become more challenging.

For instance, hotspot sensors may be needed in SoCs (systems-on-chips) to maximize the peak performance capabilities of CPU and graphics cores in small geometries where the power density can be extremely high for short durations. Bipolar-based temperature sensors are often used but are subject to performance changes and degradations from the foundry as they are optimized for MOS performance. These issues lead to unpredictable accuracy and late changes in bipolar-based temperature sensors, which may lead to product risk, churn, and potentially compromised performance.

The present disclosure is directed to temperature sensors that utilize simple resistors and rely on the resistors' temperature sensitivity to provide temperature sensing. The temperature sensitive resistors may be well defined and have less structural complexities, which can lead to spread in temperature sensing. The present disclosure is also directed to a temperature sensor circuit implementing the temperature sensitive resistors. The temperature sensor circuit implements the temperature sensitive resistors along with the resistors that are relatively stable with temperature to output a voltage signal that is indicative of the temperature sensed by the circuit. Other embodiments can utilize any two resistors with differing temperature coefficients, positive or negative depending on available technology and desired temperature characteristic. In some embodiments, the signal from the temperature sensitive resistors is increased through the use of a feedback resistor loop where the feedback resistor may have the same temperature sensitivity as the temperature sensitive resistors.

In various embodiments, one or both of these two types of resistors can be formed through utilization of the metal interconnect stack in a given technology. Additionally, other embodiments are possible where one or both of the resistors are provided through the foundry technology resistor layers, if available. In certain embodiments, a first stack forms a resistor with a high positive temperature coefficient to provide the temperature sensitive resistor and a second stack (typically above the first stack) forms a resistor that has a suitably different temperature coefficient (negative or positive), in this case slightly negative. The combination of these two stacks provides a structure for extracting a strong temperature signal. Various embodiments of resistor stacks and temperature sensor circuits implementing such resistor stacks are now discussed in further detail.

FIG. 1 depicts a cross-sectional representation of an embodiment of a resistor structure. In the illustrated embodiment, resistor structure 100 includes substrate 110 with first resistor stack 120 and second resistor stack 130 formed on the substrate. In certain embodiments, substrate 110 is a silicon substrate. In various embodiments, substrate 110 includes an oxide diffusion region 112 between trench isolations 114.

First resistor stack 120 may include a number of metal and electrically insulating layers ("insulating layers") with structures (e.g., traces) in the metal layers connected by vias through the insulating layers. For instance, in the illustrated embodiment, first resistor stack 120 includes six metal layers (e.g., "metal layer 0" through "metal layer 5") and six insulating layers (e.g., insulating layers 124A-124F). It should be understood that any number of metal layers and insulating layers may be implemented depending on, for example, resistance requirements or other operating requirements for the resistor stack. Insulating layers 124A-124F encapsulate (e.g., surround) the respective metal structures in each metal layer (e.g., metal traces 122A-122F for metal layers 0-5) providing electrical insulation and electrically separating the metal traces. Metal traces for each metal layer are also designated by "M0" (metal layer 0 traces 122A), "M1" (metal layer 1 traces 122B), "M2" (metal layer 2 traces 122C), "M3" (metal layer 3 traces 122D), "M4" (metal layer 4 traces 122E), and "M5" (metal layer 5 traces 122F) in first resistor stack 120, as shown in FIG. 1.

In the illustrated embodiment, vias at each level in first resistor stack 120 are designated by "V0" (vias 126A), "V1" (vias 126B), "V2" (vias 126C), "V3" (vias 126D), "V4" (vias 126E), and "V5" (vias 126F). Vias (e.g., vias 126A-126F) may connect metal traces 122 in a metal layer to metal traces 122 in another metal layer through the insulating layers 124. For instance, vias 126A may connect metal layer 0 traces 122A (M0) to metal layer 1 traces 122B (M1), vias 126B may connect metal layer 1 traces 122B (M1) to metal layer 2 traces 122C (M2), etc.

In some embodiments, the pitch of metal traces 122 in first resistor stack 120 are alternated (e.g., between horizontal and vertical). FIG. 2 depicts a top-view representation of an embodiment of a horizontal pitch layer 200 of metal trace 122. FIG. 3 depicts a top-view representation of an embodiment of a vertical pitch layer 300 of metal trace 122'. The metal traces 122/122' in horizontal pitch layer 200 and vertical pitch layer 300, respectively, may be overlapped and connected to form a two-layer resistor unit.

FIG. 4 depicts a top-view representation of an embodiment of two-layer resistor unit 400. In various embodiments, metal trace 122 includes a first terminal 202 at one end and via 124 at a second end while metal trace 122' includes a second terminal 302 (also shown in FIGS. 2 and 3). First terminal 202 and second terminal 302 may be end terminals for two-layer resistor unit 400 with via 124 providing an intermediate connection between metal trace 122 and metal trace 122' between the end terminals. Accordingly, metal trace 122 and metal trace 122' may be coupled in series between first terminal 202 and second terminal 302 by via 124. While FIGS. 2-4 depict possible patterns for metal traces 122 in first resistor stack 120, it should be understood that additional embodiments with other designs of metal traces may be implemented to provide similar properties to the disclosed embodiments of first resistor stack 120.

In some contemplated embodiments, another resistor unit may be built out of two (two-layer) resistor units 400 coupled in series through first terminal 202. FIG. 5 depicts a top view-representation of an embodiment of resistor unit 500. Resistor unit 500 includes two resistor units 400A, 400B coupled side-by-side in series at first terminals 202A, 202B (e.g., each resistor unit's respective first terminal). Coupling resistor units 400A, 400B side-by-side, as shown in FIG. 5, allows connectivity to resistor unit 500 in the same metal layer. For instance, both first terminal 202A for first resistor unit 400A and first terminal 202B for second resistor unit 400B are positioned in a first metal layer while both second terminal 302A for first resistor unit 400A and second terminal 302B for second resistor unit 400B are positioned in a second metal layer.

Turning back to FIG. 1, second resistor stack 130 is formed above (e.g., on top of) first resistor stack 120. In certain embodiments, second resistor stack 130 includes metal layers having metal traces 132 and insulating layers 134. In one contemplated embodiment, second resistor stack include layers of metal traces (metal layer 6 traces 132A and metal layer 7 traces 132B, which are also designated as "M6" and "M7", respectively). These metal traces 132 may be connected by vias 136 through insulating layers 134. For instance, vias 136A ("V6") may connect metal layer 6 traces 132A to metal layer 7 traces 132B through insulating layer 134B.

In some embodiments, as shown in FIG. 1, metal layer 6 traces 132A are coupled to metal 5 layer traces 122F in first resistor stack 120. For example, vias 126F ("V5") may connect metal layer 6 traces 132A to metal 5 layer traces 122F. In some embodiments, metal layer 6 traces 132A are connected to metal 5 layer traces 122F to connect the resistor in second resistor stack 130 in series to the resistor in first resistor stack 120, as described herein. It is possible, however, that some of metal layer 6 traces 132A may be connected to some of metal 5 layer traces 122F that do not form a part of the resistor in first resistor stack 120. Vias 136B may connect metal layer 7 traces 132B to any additional metal traces or devices positioned above second resistor stack 130. For instance, vias 136B may connect metal layer 7 traces 132B to metal layer 8 traces that provide connections to various circuit components described herein.

In various embodiments, power routing layer 140 is formed between substrate 110 and first resistor stack 120. Power routing layer 140 may be formed to provide power and ground connections to first resistor stack 120. For example, power routing layer 140 may be a metal layer and an insulating layer with vias connecting the metal layer to first resistor stack 120 through the insulating layer. In the illustrated embodiment, power routing layer 140 includes power connections 142 ("MD" and "VD") and ground connections 144 ("MG" and "VG") to first resistor stack 120 with insulating layer 146 surrounding the power and ground connections. Power routing layer 140 may further include routings (not shown) to various power and ground sources on substrate 110.

In various embodiments, one or more resistors are formed from first resistor stack 120 and second resistor stack 130 on substrate 110. These resistors may have specific resistive properties determined by the materials and design of the respective resistor stacks. For example, in one contemplated embodiment, first resistor stack 120 forms a first resistor with a first set of specific resistive properties and second resistor stack 130 forms a second resistor with a second set of specific resistive properties. Additional embodiments may be contemplated where first resistor stack 120 or second resistor stack 130 form multiple resistors where each resistor formed in a resistor stack has similar resistive properties.

First resistor stack 120 and second resistor stack 130 may form resistors with specific resistive properties for implementation in temperature sensor circuits such as those described herein. For instance, in certain embodiments, first resistor stack 120 forms a resistor that has a positive temperature coefficient while second resistor stack 130 forms a resistor that has a negative temperature coefficient. First resistor stack 120 may have the positive temperature coefficient while second resistor stack 130 has the negative temperature coefficient to provide differential temperature properties between the first resistor stack and the second resistor stack. In some embodiments, second resistor stack 130 may form a resistor that has a slightly positive temperature coefficient (e.g., a positive temperature coefficient less than the temperature coefficient of first resistor stack 120). In such embodiments, the positive temperature coefficient of first resistor stack 120 is sufficiently higher than the positive temperature coefficient of second resistor stack 130, as described below, to provide differential temperature properties between the first resistor stack and the second resistor stack.

These differential temperature properties may allow first resistor stack 120 and second resistor stack 130 to be implemented as resistors for temperature sensor circuits described herein. For example, first resistor stack 120 and second resistor stack 130 may be placed in circuits that output a voltage signal that corresponds to a differential between a first voltage across the first resistor stack and a second voltage across the second resistor stack. The voltage signal changes based on temperature due to the differential temperature properties of first resistor stack 120 and second resistor stack 130 and thus, a temperature may be determined based on the voltage signal.

In certain embodiments, the temperature coefficient for first resistor stack 120 has a higher magnitude than the temperature coefficient for second resistor stack 130 (e.g., the positive temperature coefficient of the first resistor stack has a larger absolute value than the negative (or positive) temperature coefficient of the second resistor stack). For example, the absolute value of the temperature coefficient of first resistor stack 120 may be at least two times the absolute value of the temperature coefficient of second resistor stack 130. In certain embodiments, the absolute value of the temperature coefficient of first resistor stack 120 may be at least five times the absolute value of the temperature coefficient of second resistor stack 130.

In various embodiments, first resistor stack 120 may have a positive temperature coefficient with an absolute value of at least about 500 ppm/° C. (e.g., the positive temperature coefficient is greater than about 500 ppm/° C.) while second resistor stack 130 has a negative (or positive) temperature coefficient with an absolute value of at most about 200 ppm/° C. (e.g., the temperature coefficient is between 0 ppm/° C. and about −200 ppm/° C. or between 0 ppm/° C. and about 200 ppm/° C.). Accordingly, the resistance of first resistor stack 120 is more sensitive to temperature than the resistance of second resistor stack 130. In some embodiments, the resistance of second resistor stack 130 is relatively stable with temperature (e.g., the negative or positive temperature coefficient is close to zero). Additionally, in various embodiments, the resistance of second resistor stack 130 is relatively high (e.g., the second resistor stack is a Hi-R resistor).

In one contemplated embodiment, first resistor stack 120 has a temperature coefficient of +1500 ppm/° C. while second resistor stack has a temperature coefficient of −130 ppm/° C. In such an embodiment, first resistor stack 120 is 11.5× more sensitive to temperature than second resistor stack 130. The higher sensitivity of first resistor stack 120 may enable temperature measurement based on differentials in resistance changes between the first resistor stack and second resistor stack 130.

In various embodiments, the metal layers (e.g., metal traces) in first resistor stack 120 also have improved piezoresistivity compared to doped silicon. For instance, the metal layers in first resistor stack 120 may have a piezoresistivity that is about 2 orders of magnitude less than a piezoresistivity of doped silicon. In some embodiments, the metal layers in second resistor stack 130 may also have a lower piezoresistivity than doped silicon. The lower piezoresistivity may reduce the effects of packaging or mechanical stress on the resistance of first resistor stack 120. Thus, temperature sensing using circuits with first resistor stack 120 and second resistor stack 130 may be less sensitive to mechanical variations caused during manufacturing. Additionally, first resistor stack 120 and second resistor stack 130 may be placed under bumps or other connections that cause additional mechanical stress without affecting the temperature sensing properties of the resistor stacks.

In certain embodiments, first resistor stack 120 has an electrical resistivity between 10 Ω/μm and 30 Ω/μm. For instance, first resistor stack 120 may have an electrical resistivity of about 20 Ω/μm. Such electrical resistivities may provide reasonable resistances for generating voltage drops that can be sensed/detected by the temperature sensing circuits described herein. Additionally, such electrical resistivities may allow low voltage operation.

Figure 6:
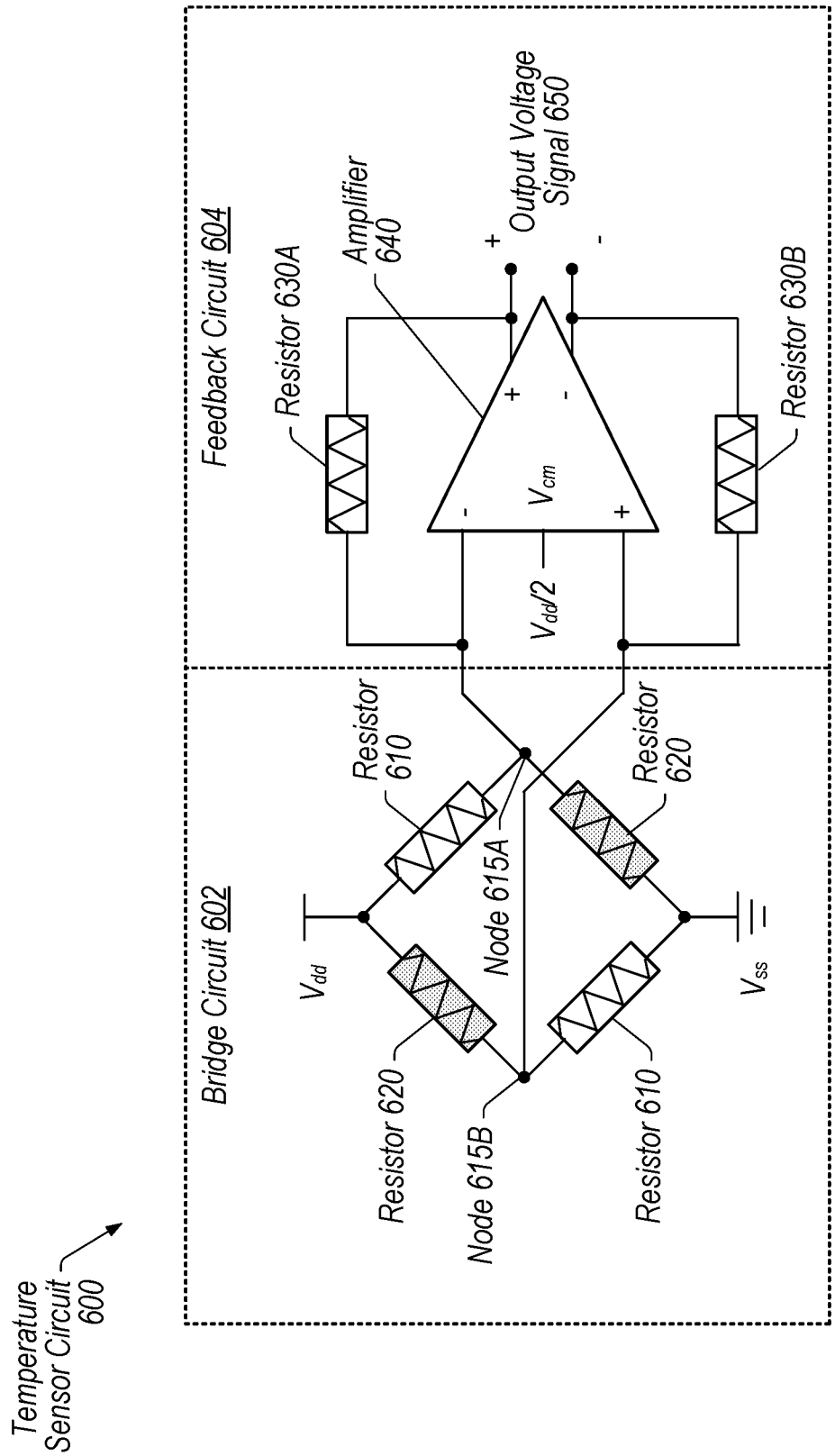
FIG. 6 depicts a block diagram of a temperature sensor interface circuit, according to some embodiments.
Figure 7:
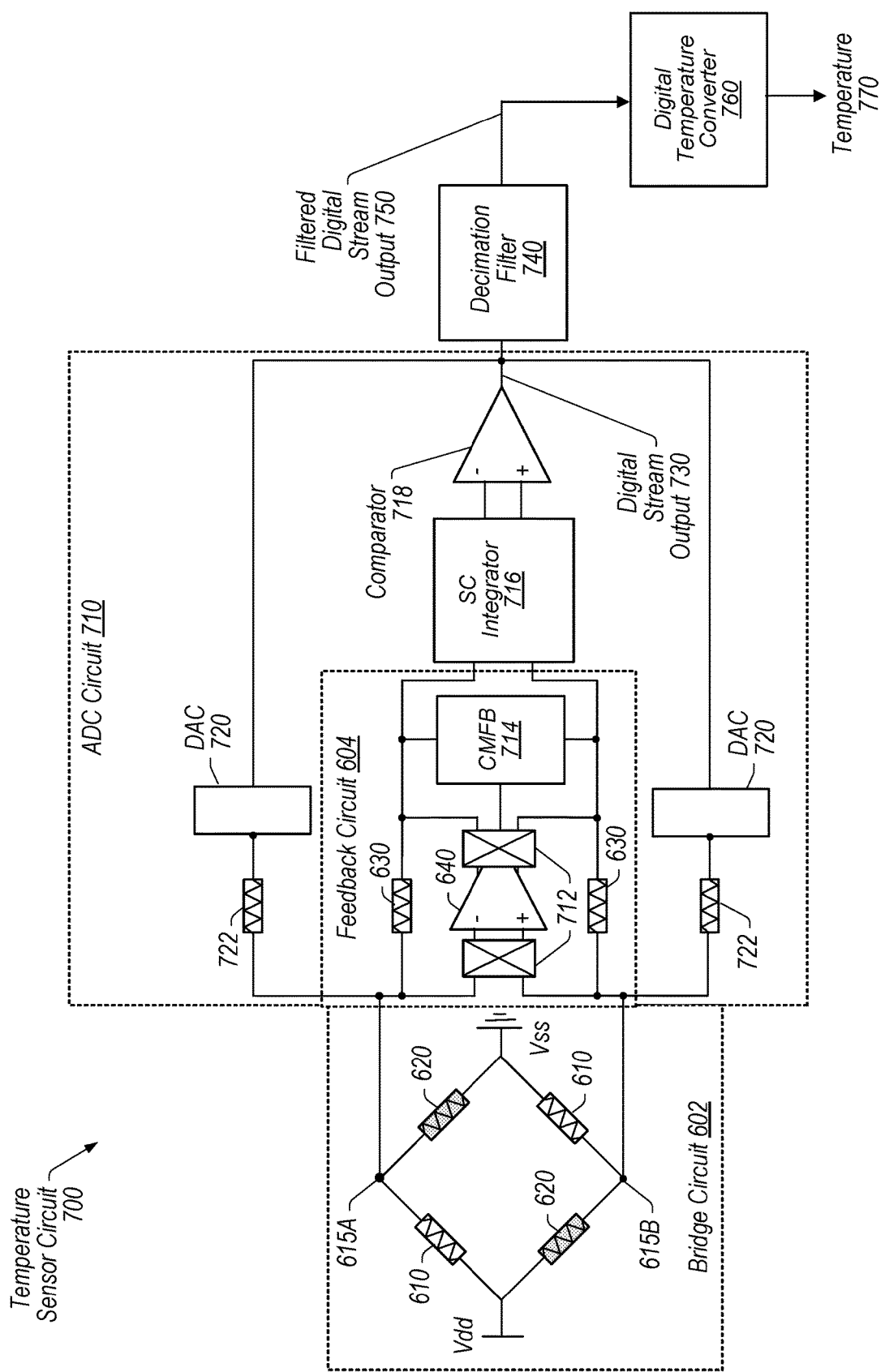
FIG. 7 depicts a block diagram of another temperature sensor circuit with integrated digital conversion, according to some embodiments.
Figure 8:
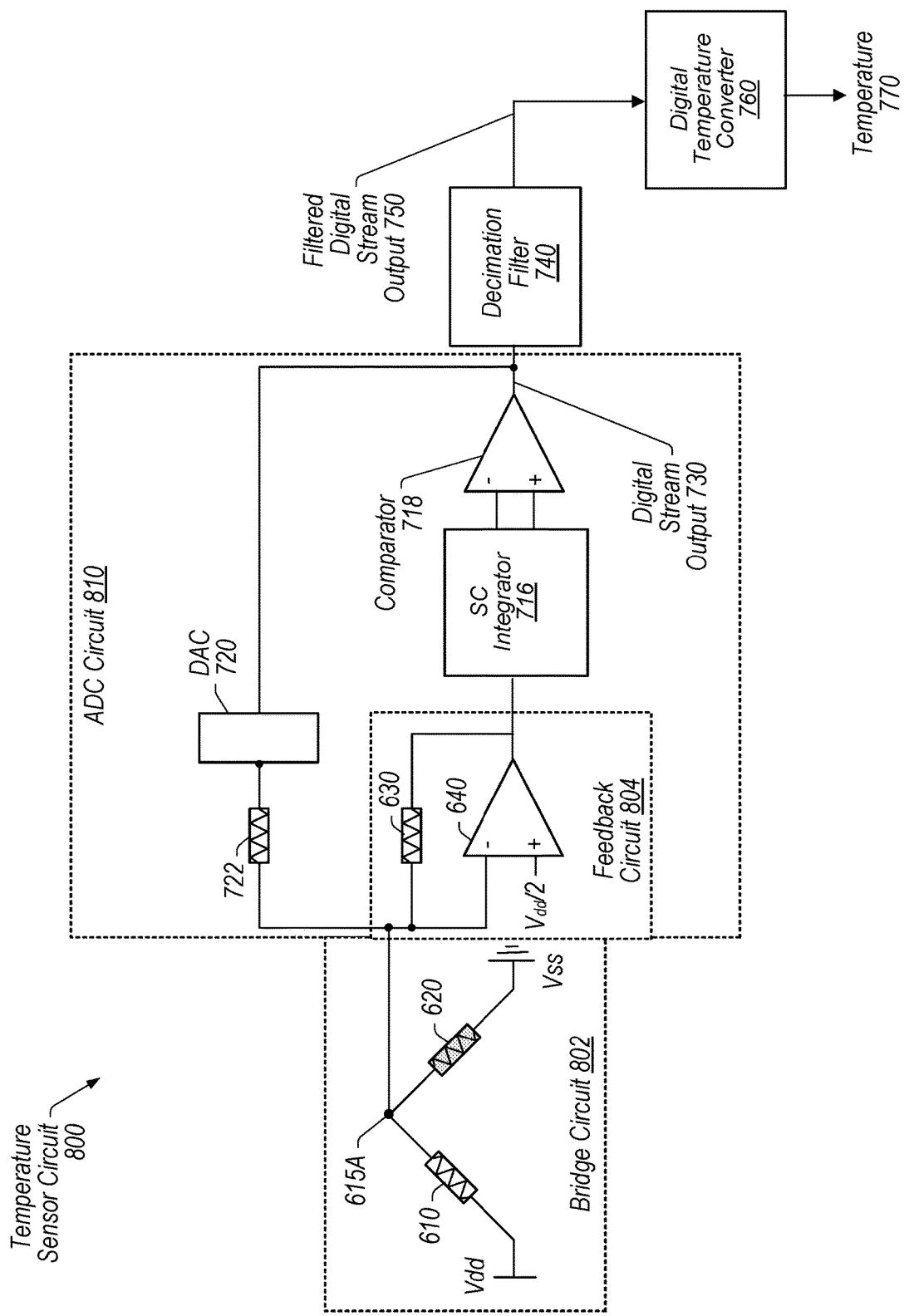
FIG. 8 depicts a block diagram of a single-ended temperature sensor circuit with integrated digital conversion, according to some embodiments.

Turning now to temperature sensor circuits, FIGS. 6-8 depict various embodiments of circuits that implement first resistor stack 120 and second resistor stack 130 for temperature sensing. It should be understood that various transistor or transistor-based components described herein may be implemented as a MOSFET, a FinFET, or a GAAFET.

FIG. 6 depicts a block diagram of a temperature sensor circuit, according to some embodiments. In the illustrated embodiment, temperature sensor circuit 600 includes bridge circuit 602 with resistors 610 and resistors 620 and feedback circuit 604 with resistors 630, and amplifier 640. Resistors 610 may be resistors formed by first resistor stacks 120 while resistors 620 may be resistors formed by second resistor stacks 130. In certain embodiments, resistors 610 have the positive temperature coefficient with a higher absolute value of first resistor stack while resistors 620 have the negative (or slightly positive) temperature coefficient of resistors 620 with a lower absolute value. Accordingly, the resistance of resistors 610 has higher sensitivity to temperature changes than the resistance of resistors 620.

In the illustrated embodiment, bridge circuit 602 includes resistors 610 and resistors 620 coupled in a bridge configuration (e.g., Wheatstone bridge) between the source voltage ("Vdd") and the ground voltage ("Vss"). In certain embodiments, bridge circuit 602 is coupled to feedback circuit 604. Feedback circuit 604 may be implemented to scale up the voltage signal from bridge circuit 602 to provide a stronger output voltage signal 650 from temperature sensor circuit 600. As shown in FIG. 6, feedback circuit 604 includes resistors 630 and amplifier 640 coupled to nodes 615A, 615B in bridge circuit 602. Nodes 615A, 615B are nodes coupled in series between resistors 610 and resistors 620 on either side of bridge circuit 602. Node 615A is coupled to resistor 630A and a first input (e.g., the negative input) of amplifier 640. Node 615B is coupled to resistor 630B and a second input (e.g., the positive input) of amplifier 640. Resistor 630A is also coupled to a first output (e.g., the positive output) of amplifier 640 while resistor 630B is also coupled to a second output (e.g., the negative output) of amplifier 640.

In certain embodiments, resistors 630 (e.g., resistor 630A and resistor 630B) are feedback resistors with the same temperature coefficient as resistors 610. Thus, resistors 630 may be formed by first resistor stacks 120, described herein. In various embodiments, resistors 630 may have a higher resistance than resistors 610. As resistors 630 have the same temperature coefficient as resistors 610 but higher resistance, resistors 630 may provide gain for the voltage signal from resistors 610 and bridge circuit 602. For example, the voltage signal from bridge circuit 602 may be scaled up by a factor, k, determined by the resistance values of resistors 630 versus the resistance values of resistors 610.

Amplifier 640 may be, for example, an operational (e.g., transimpedance) differential amplifier that is implemented using a biased differential pair of inputs and outputs (e.g., the positive and negative inputs/outputs). Accordingly, amplifier 640 may provide bias control (and gain in combination with resistors 630) for the voltage signal from resistors 610 and bridge circuit 602. In some embodiments, amplifier 640 provides common mode voltage correction at Vcm with the voltage correction being around Vdd/2 for the two outputs of bridge circuit 602 at nodes 615A, 615B.

In certain embodiments, output voltage signal 650 from temperature sensor circuit 600 is a voltage signal that corresponds to the differential between the voltage across resistors 610 and the voltage across resistors 620. Because of the differences in temperature coefficients of resistors 610 and resistors 620, output voltage signal 650 may be calibrated to indicate a temperature sensed by temperature sensor circuit 600 (e.g., a temperature at or near the temperature sensor circuit). Accordingly, a temperature at any given time may be determined based on output voltage signal 650 from temperature sensor circuit 600, as described below.

FIG. 7 depicts a block diagram of another temperature sensor circuit, according to some embodiments. In the illustrated embodiment, temperature sensor circuit 700 includes bridge circuit 602 (with resistors 610 and resistors 620), feedback circuit 604 (with resistors 630 and amplifier 640), and ADC (analog-to-digital converter) circuit 710. In various embodiments, ADC circuit 710 includes switches 712, CMFB (common mode feedback circuit) 714, SC (switched-capacitor) integrator 716, comparator 718, DACs (digital-to-analog converters) 720, and resistors 722.

Switches 712 may be, for example, crossbar switches (e.g., switches implemented with pass gates). Switches 712 may switch the two inputs (and the two outputs) at predetermined times (e.g., according to a clock signal). Switching the inputs and the outputs using switches 712 may cancel any inherent offset in amplifier 640 caused by different electrical properties in the differential pair of the amplifier. CMFB 714 may be configured to sense the common mode voltage of the outputs of amplifier 640 and compare the outputs to a reference (e.g., Vdd/2). CMFB 714 may feed a signal back to adjust the common mode operating point of amplifier 640 based on the comparison of outputs to the reference.

SC integrator 716 may be, for example, a switched-capacitor integrator circuit configured to sample the outputs of amplifier 640 and then integrate the sampled values for a predetermined period of time. SC integrator 716 may generate a differentially encoded output (e.g., two voltage level outputs) based on the integrated sample values that is provided to comparator 718. In various embodiments, comparator 718 operates as an analog-to-digital converter circuit (e.g., a 1-bit ADC). Comparator 718 may change a logic value of its output based on a comparison of the two voltage levels input from SC integrator 716. Accordingly, comparator 718 may clamp its output at either the voltage level of the power supply (Vdd) or ground (Vss).

In various embodiments, as shown in FIG. 7, the output of comparator 718 is provided to DACs 720. DACs 720 may be, for example, 1-bit DACs that generate a global feedback current into or out of the inputs (e.g., positive/negative inputs) of amplifier 640, thus closing a global feedback loop around the temperature sensor. The direction of the feedback current changes when the output of comparator 718 switches logic state, thereby causing SC integrator 716 to progress in the opposite direction. The feedback current passes through resistors 722. Resistors 722 may have the same temperature coefficient as resistors 610 and resistors 630. Thus, resistors 722 may be formed from first resistor stack 120. The value and dynamic range of the feedback current may be determined by the value of resistors 722. For instance, the feedback current value and dynamic range may be based on Vdd divided by the resistance of resistors 722. Accordingly, both bridge signal and feedback currents are ratiometric to Vdd, thereby providing closed loop cancellation of the absolute value of Vdd. In some embodiments resistors 610 and 620 in the bridge can be current balanced with a single point calibration by making either pair a programmable DAC structure, for example, R2R DAC structures. Remaining gain errors from resistor mismatches can be removed through Dynamic Element Matching (DEM) and/or chopping modulation in some embodiments.

ADC circuit 710, shown in FIG. 7, may be referred to as a double-ended sigma-delta converter that generates a stream of digital bits whose value corresponds to a temperature detected by temperature sensor circuit 700 based on resistors 610 and resistors 620 in bridge circuit 602. For example, bridge circuit 602 generates a voltage with a value that corresponds to the temperature based on the differential resistances between resistors 610 and resistors 620. Feedback circuit 604 provides gain and bias control for the voltage from bridge circuit 602. ADC circuit 710 then generates digital (bit) stream output 730 from the voltage output provided by feedback circuit 604. In various embodiments, digital stream output 730 generated by ADC circuit 710 has a ratio of the number of logical-1s to the number of logical-0s over a period of time that corresponds to the voltage from feedback circuit 604. Thus, the digital bit stream corresponds to the temperature represented by the differential voltages across resistors 610 and resistors 620.

In some embodiments, digital stream output 730 passes through decimation filter 740 after comparator 718. Decimation filter 740 may down sample the stream of bits in digital stream output 730. For example, decimation filter 740 may drop every nth bit by implementing a counter or other sequential logic circuit to track the bits being received by comparator 718. The output of decimation filter 740 may be provided as filtered digital stream output 750. The down sampling by decimation filter 740 may help in removing noise from digital stream output 730 that can be generated as the output of SC integrator 716 passes through the threshold of comparator 718, potentially causing the output of the comparator to quickly toggle between logic values.

In various embodiments, filtered digital stream output 750 is provided to digital temperature converter 760. Digital temperature converter 760 may be any logic circuit or other circuit that converts filtered digital stream output 750 to temperature 770. For example, digital temperature converter 760 may be a polynomial solver or other mathematical solver capable of converting a digital stream into a temperature. In various embodiments, digital temperature converter 760 converters filtered digital stream output 750 to temperature 770 based on a calibration determined for temperature sensor circuit 700.

While ADC circuit 710, shown in FIG. 7, is a double-ended sigma-delta converter, various embodiments of single-ended sigma-delta converters may be contemplated. Single-ended sigma-delta converters may be implemented with single-ended bridges (e.g., half of bridge circuit 602 with one resistor 610 and one resistor 620 in series between Vdd and Vss). A single-ended temperature sensor circuit (with a single-ended sigma-delta converter circuit, a single-ended bridge circuit, and a single-ended feedback circuit) may be implemented in embodiments where reduced power consumption and reduced area consumption are desired and less accuracy in temperature sensitivity is allowable.

FIG. 8 depicts a block diagram of a single-ended temperature sensor circuit, according to some embodiments. In the illustrated embodiment, single-ended temperature sensor circuit 800 includes single-ended bridge circuit 802, single-ended feedback circuit 804, and single-ended ADC circuit 810. In single-ended temperature sensor circuit 800, bridge circuit 802 includes a single resistor 610 and a single resistor 620 coupled in series between Vdd and Vss. Output of bridge circuit 802 is provided through node 615A, which is coupled between resistor 630 in feedback circuit 804 and resistor 722 in ADC circuit 810. Amplifier 640 receives the voltage output of bridge circuit 802 at a first input (e.g., the negative input) along with Vdd/2 at a second input (e.g., the positive input). Amplifier generates an output voltage signal based on a comparison between the voltage output of bridge circuit 802 (plus feedback provided from resistor 630, DAC 720, and resistor 722) and Vdd/2. Subsequently, SC integrator 716 and comparator 718 in ADC circuit 810 operate similarly to the embodiment of ADC circuit 710, shown in FIG. 7, to provide digital stream output 730. As described above, digital stream output 730 may be filtered through decimation filter 740 to generate filtered digital stream output 750, which may be converted to temperature 770 by digital temperature converter 760.

Various temperature sensor circuits that are based on resistor stacks with different temperature coefficients are described herein. For example, temperature sensor circuits 600, 700, 800 may implement different temperature coefficient resistors based on first resistor stack 120 and second resistor stack 130. The various temperature sensor circuits described herein may be implemented at a reduced chip area cost relative to other known temperature sensor circuits. For example, temperature sensor circuits based on first resistor stack 120 and second resistor stack 130 may have a reduced chip area cost relative to bipolar junction-based temperature sensors and μ-bipolar junction-based temperature sensors.

The temperature sensor circuits based on first resistor stack 120 and second resistor stack 130 that are described herein may also have similar, or even better, temperature sensing accuracy to implementations of bipolar junction-based temperature sensors and μ-bipolar junction-based temperature sensors. For instance, the temperature sensor circuits disclosed herein may have a 3G sensor accuracy of less than about ±3° C. The disclosed temperature sensor circuits may also have reduced power consumption compared to bipolar junction-based temperature sensors and μ-bipolar junction-based temperature sensors. For instance, the disclosed temperature sensor circuits may have power consumption that is two orders of magnitude or greater below the power consumption of bipolar junction-based temperature sensors and μ-bipolar junction-based temperature sensors. The temperature sensor circuits disclosed herein have the capability to run from lower supply voltages than bipolar junction-based counterparts. They also possess better inherent power supply noise rejection through the global closed loop concept and ratiometric power supply derived signal and reference currents. The temperature sensor circuits disclosed herein may permit SoC's to use a lower cost process technology by utilizing existing metal interconnect stack as a resistive transducer. The temperature sensor circuits disclosed herein may allow reduced sensitivity to mechanical stress and strain compared to bipolar junction-based temperature sensors.

Example Implementations of Temperature Sensor Circuits

Figure 9:
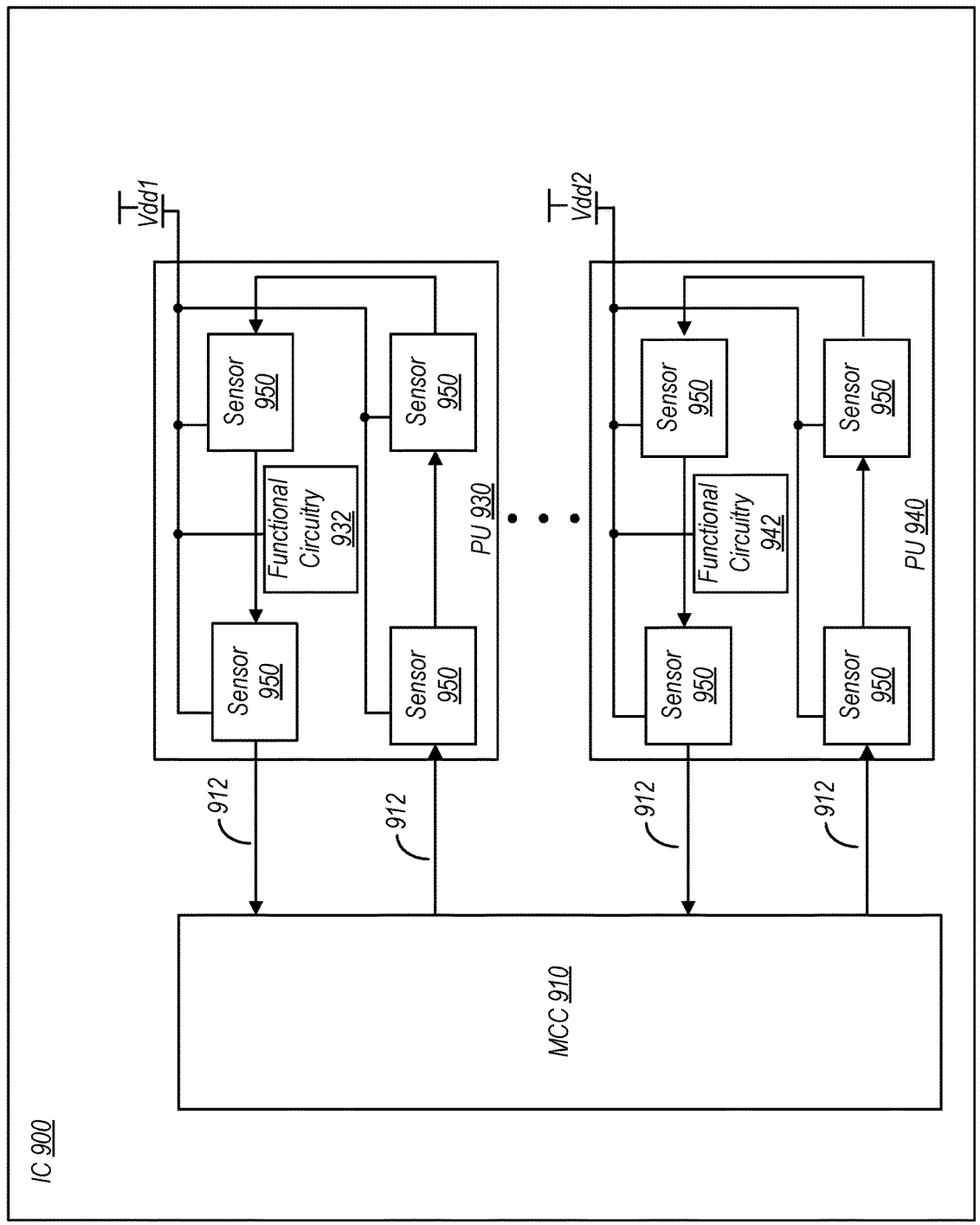
FIG. 9 depicts a block diagram of an embodiment of an integrated circuit.

FIG. 9 depicts a block diagram of an embodiment of an integrated circuit (IC). In the illustrated embodiment shown, IC 900 includes metrology control circuitry (MCC) 910 and two functional circuit blocks, processing unit (PU) 930, and PU 940. In various embodiments, other functional circuit blocks may be included, including additional instances of PU 930 or PU 940. PU 930 and PU 940 are thus shown here as exemplary functional circuit blocks, but are not intended to limit the scope of this disclosure. Each of PU 930 and 940 may be a general purpose processor core, a central processing unit (CPU), a graphics processing unit (GPU), a digital signal processing unit, or virtually any other kind of functional unit/circuitry configured to perform a processing function. The scope of this disclosure may apply to any of these types of functional circuit blocks, as well as others not explicitly mentioned herein. The number of functional circuit blocks shown here is by way of example as well, as the disclosure is not limited to any particular number.

In certain embodiments, PU 930 is a general purpose processor core configured to execute the instructions of an instruction set and perform general purpose processing operations. Functional circuitry 932 of PU 930 may thus include various types of circuitry such as execution units of various types (integer, floating point, etc.), register files, schedulers, instruction fetch units, various levels of cache memory, and other circuitry that may be implemented in a processor core. In certain embodiments, functional circuitry 932 in PU 930 is coupled to receive first supply voltage Vdd1.

In certain embodiments, PU 940 includes functional circuitry 942, which may implement various types of graphics processing circuitry such that PU 940 is a GPU. This may include graphics processing cores, various types of memory and registers, and so on. In some embodiments, functional circuitry 142 in PU 140 is coupled to receive a second supply voltage, Vdd2.

In certain embodiments, both PU 930 and PU 940 include a number of sensors 950. The particular number of sensors 950 shown here is for example only, and in actual embodiments may be greater, lesser, or equal. Sensors 950 may be configured for sensing one or more operating properties of PU 930 or PU 940 (e.g., performance metrics or parameters of the processing units). In certain embodiments, sensors 950 are configured to sense operating voltage or operating temperature values (e.g., local operating voltage or operating temperature values for PU 930 and/or PU 940). Sensors 950 may implement, for example, any of the temperature sensor circuits described herein. For instance, sensor 950 may implement temperature sensor circuit 600, shown in FIG. 6, temperature sensor circuit 700, shown in FIG. 7, or temperature sensor circuit 800, shown in FIG. 8. The sensed voltage and temperature values may in turn be used to determine whether or not circuitry implemented therein (e.g., functional circuitry 932 or functional circuitry 942) is operating within limits, must be restricted to lower performance operation, and/or is capable of higher performance. In some embodiments, sensors 950 are configured to sense other local operating values such as, but not limited to, current.

Figure 10:
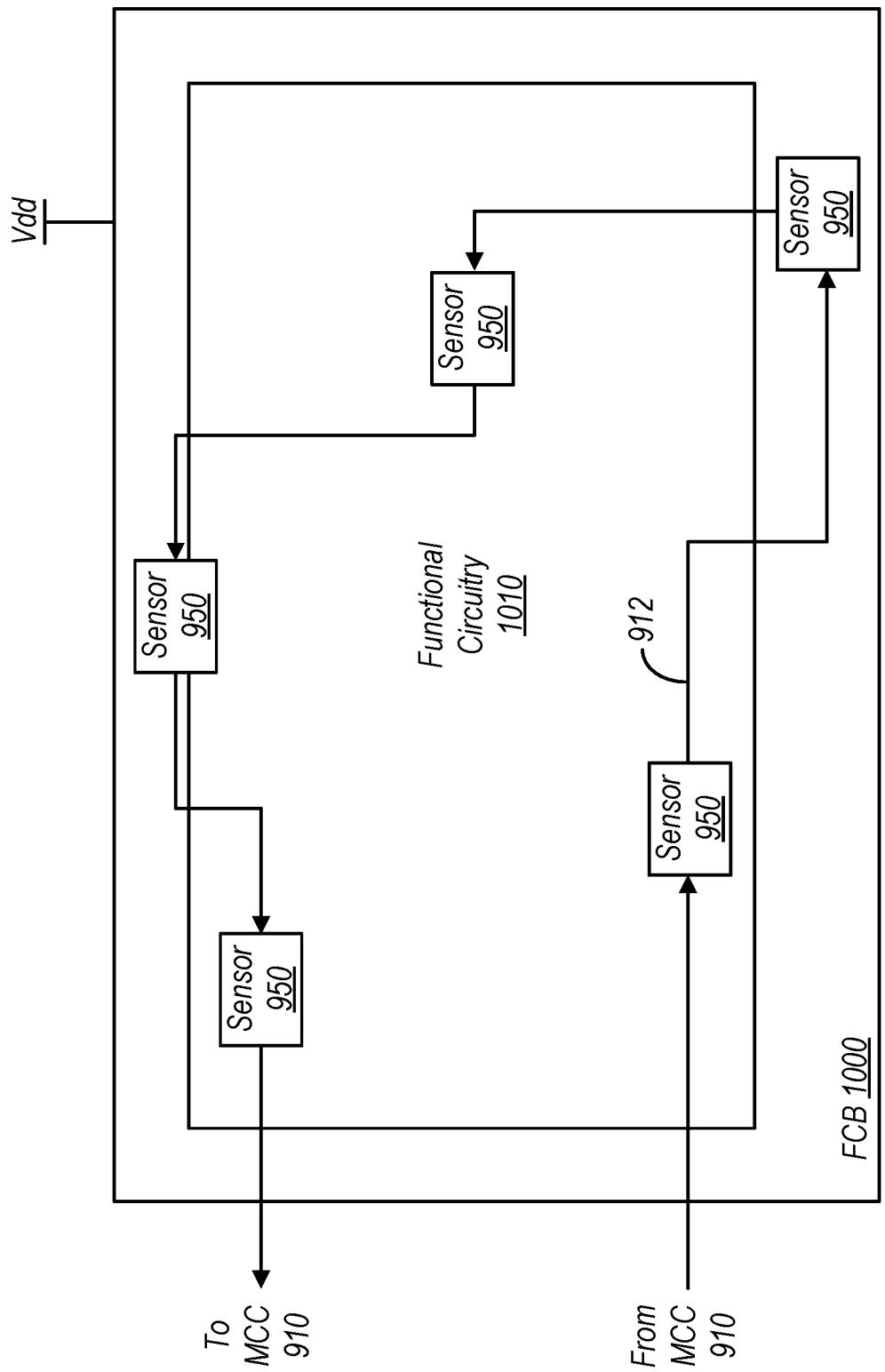
FIG. 10 is a block diagram of one embodiment of a functional circuit block having a number of sensors.

FIG. 10 is a block diagram of one embodiment of a functional circuit block having a number of sensors 950. In the illustrated embodiment, functional circuit block (FCB) 1000 includes functional circuitry 1010, which may be virtually any type of functional circuitry implemented on an IC (such as PU 930 and/or PU 940). Included in functional circuitry 1010 may be digital circuits, analog circuits, and/or mixed signal circuits. FCB 1000 also includes a number of sensors 950, which may be connected in a serial chain by bus 912. Sensors 950 of FCB 1000 are implemented in various places in and around functional circuitry 1010. A first sensor 950 in the embodiment shown is coupled to receive information, via bus 912, from MCC 910, while a last sensor 950 may send information, via bus 912, to MCC 910. In various embodiments, each of the sensors 950 is coupled to receive the same supply voltage, Vdd, as received by the functional circuitry 1010 though other embodiments may be contemplated where the sensors operate from different supply voltages received by the functional circuitry 1010.

Turning back to FIG. 9, in the illustrated embodiment, IC 900 includes metrology control circuitry (MCC) 910. MCC 910 may be, for example, a universal controller that performs various operations involved with operation of sensors 950 in the various functional circuit blocks of IC 900. In some embodiments, MCC 910 is coupled to each of the sensors 950 via bus 912. During operation of IC 900, as described herein, sensors 950 may perform readings (e.g., frequencies of ring oscillators or voltages of BJTs), convert the readings into a digital format, and transmit the digitally formatted information as output to MCC 910. MCC 910 may receive the output information from sensors 950 via their correspondingly coupled instances of metrology bus 912. Using the output information, MCC 910 may determine a voltage or temperature sensed by each of sensors 950. In certain embodiments, bus 912 is a serial bus, and a group of sensors 950 are coupled serially in a scan chain. Embodiments for mechanisms of communication with groups (sets) of sensors 950 are described herein.

Example Method

FIG. 11 is a flow diagram illustrating a method for determining a temperature of an integrated device. Method 1100 may be implemented using any of the embodiments of a temperature sensor circuit as disclosed herein, in conjunction with any circuitry or other mechanism in an integrated circuit.

At 1102, in the illustrated embodiment, a temperature sensor circuit positioned in an integrated circuit device assesses a differential between a first voltage across a first resistor stack and a second voltage across a second resistor stack.

At 1104, in the illustrated embodiment, the temperature sensor circuit provides a voltage signal output corresponding to the assessed differential.

At 1106, in the illustrated embodiment, a temperature of the integrated circuit device is determined based on the voltage signal output.

Example Computer System

Figure 12:
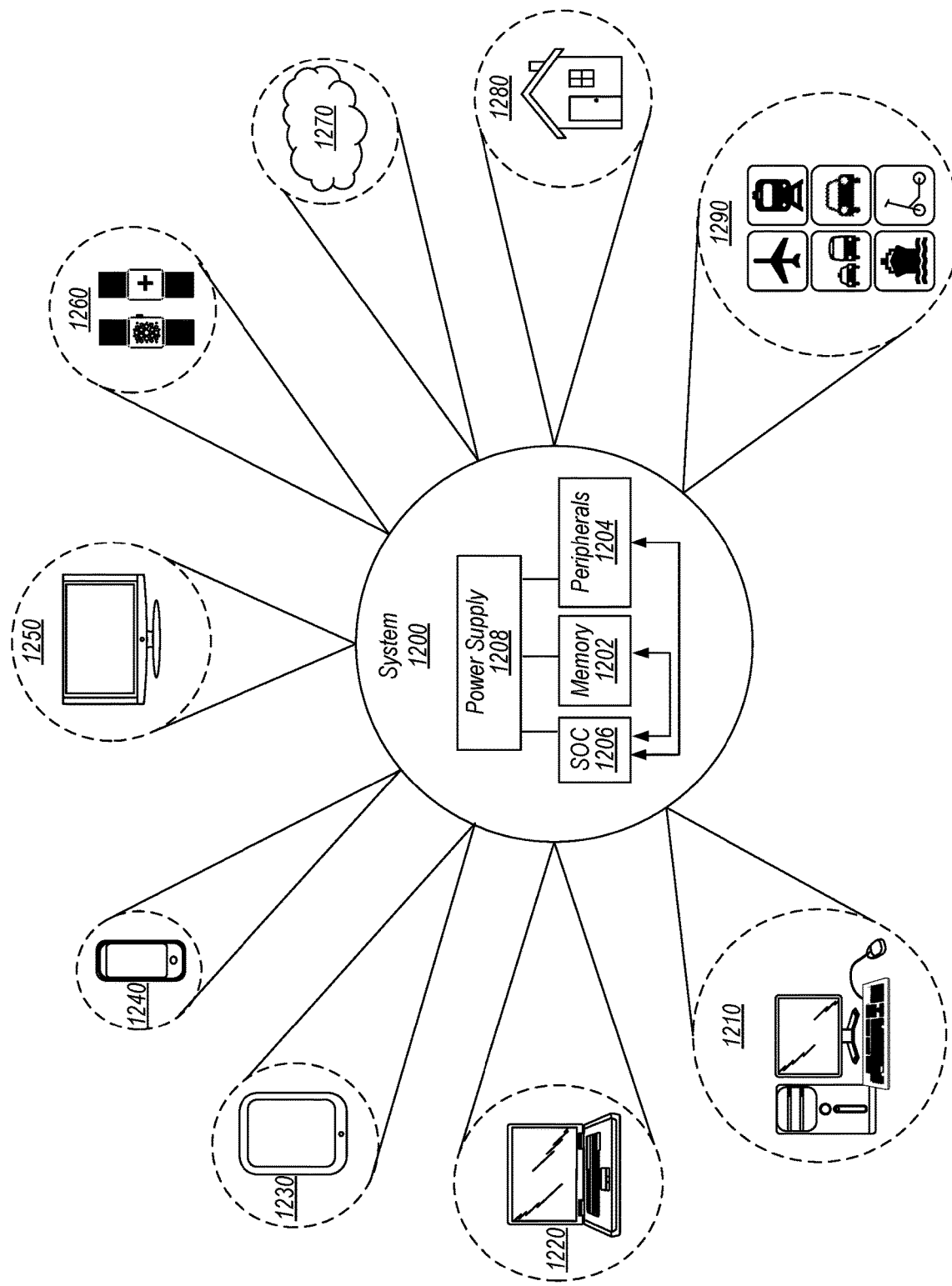
FIG. 12 is a block diagram of one embodiment of an example system.

Turning next to FIG. 12, a block diagram of one embodiment of a system 1200 is shown that may incorporate and/or otherwise utilize the methods and mechanisms described herein. In the illustrated embodiment, the system 1200 includes at least one instance of a system on chip (SoC) 1206 which may include multiple types of processing units, such as a central processing unit (CPU), a graphics processing unit (GPU), or otherwise, a communication fabric, and interfaces to memories and input/output devices. In some embodiments, one or more processors in SoC 1206 includes multiple execution lanes and an instruction issue queue. In various embodiments, SoC 1206 is coupled to external memory 1202, peripherals 1204, and power supply 1208.

A power supply 1208 is also provided which supplies the supply voltages to SoC 1206 as well as one or more supply voltages to the memory 1202 and/or the peripherals 1204. In various embodiments, power supply 1208 represents a battery (e.g., a rechargeable battery in a smart phone, laptop or tablet computer, or other device). In some embodiments, more than one instance of SoC 1206 is included (and more than one external memory 1202 is included as well).

The memory 1202 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1204 include any desired circuitry, depending on the type of system 1200. For example, in one embodiment, peripherals 1204 includes devices for various types of wireless communication, such as Wi-Fi, Bluetooth, cellular, global positioning system, etc. In some embodiments, the peripherals 1204 also include additional storage, including RAM storage, solid state storage, or disk storage. The peripherals 1204 include user interface devices such as a display screen, including touch display screens or multi-touch display screens, keyboard or other input devices, microphones, speakers, etc.

As illustrated, system 1200 is shown to have application in a wide range of areas. For example, system 1200 may be utilized as part of the chips, circuitry, components, etc., of a desktop computer 1210, laptop computer 1220, tablet computer 1230, cellular or mobile phone 1240, or television 1250 (or set-top box coupled to a television). Also illustrated is a smartwatch and health monitoring device 1260. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1200 may further be used as part of a cloud-based service(s) 1270. For example, the previously mentioned devices, and/or other devices, may access computing resources in the cloud (i.e., remotely located hardware and/or software resources). Still further, system 1200 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 12 is the application of system 1200 to various modes of transportation. For example, system 1200 may be used in the control and/or entertainment systems of aircraft, trains, buses, cars for hire, private automobiles, waterborne vessels from private boats to cruise liners, scooters (for rent or owned), and so on. In various cases, system 1200 may be used to provide automated guidance (e.g., self-driving vehicles), general systems control, and otherwise. These any many other embodiments are possible and are contemplated. It is noted that the devices and applications illustrated in FIG. 12 are illustrative only and are not intended to be limiting. Other devices are possible and are contemplated.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This Unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An integrated circuit device, comprising:
  a first resistor stack having a plurality of metal layers separated by a plurality of electrically insulating layers, the metal layers being connected by vias through the electrically insulating layers, wherein the metal layers have a plurality of metal traces separated by electrically insulating material, the metal traces being interconnected at end portions of the metal traces;
  a second resistor stack having at least one metal layer connected to an upper metal layer of the first resistor stack by a via through an electrically insulating layer in the second resistor stack;
  wherein the first resistor stack has a first temperature coefficient and the second resistor stack has a second temperature coefficient, the first temperature coefficient having an absolute value higher than an absolute value of the second temperature coefficient; and
  wherein a differential between a first voltage across the first resistor stack and a second voltage across the second resistor stack is indicative of a temperature of the integrated circuit device.

2. The integrated circuit device of claim 1, wherein the first resistor stack is formed on a silicon substrate.

3. The integrated circuit device of claim 2, wherein the second resistor stack is formed on the first resistor stack.

4. The integrated circuit device of claim 2, further comprising at least one metal layer between the first resistor stack and the silicon substrate, wherein the at least one metal layer includes power and ground connections to the first resistor stack.

5. The integrated circuit device of claim 1, wherein the absolute value of the first temperature coefficient is at least five times the absolute value of the second temperature coefficient.

6. The integrated circuit device of claim 1, wherein an absolute value of the first temperature coefficient is at least about 500 ppm/° C.

7. The integrated circuit device of claim 1, wherein an absolute value of the second temperature coefficient is at most about 200 ppm/° C.

8. The integrated circuit device of claim 1, wherein the metal layers in the first resistor stack have a piezoresistivity lower than a piezoresistivity of doped silicon.

9. The integrated circuit device of claim 1, wherein the first resistor stack includes five metal layers and the second resistor stack includes two metal layers.

10. The integrated circuit device of claim 1, wherein the first resistor stack has an electrical resistivity of between 10 Ω/μm and 30 Ω/μm.

11. A temperature sensor for an integrated circuit device, comprising:
  a first resistor stack having a plurality of metal layers separated by a plurality of electrically insulating layers, the metal layers being connected by vias through the electrically insulating layers, wherein the metal layers have a plurality of metal traces separated by electrically insulating material, the metal traces being interconnected at end portions of the metal traces, wherein the first resistor stack has a first temperature coefficient;
  a second resistor stack having at least one metal layer connected to an upper metal layer of the first resistor stack by a via through an electrically insulating layer in the second resistor stack, wherein the second resistor stack has a second temperature coefficient, the first temperature coefficient having an absolute value higher than an absolute value of the second temperature coefficient; and
  a temperature sensor circuit associated with the first resistor stack and the second resistor stack, wherein the temperature sensor circuit is configured to assess a differential current between a first voltage across the first resistor stack and a second voltage across the second resistor stack, and wherein the temperature sensor circuit is configured to provide an output indicative of a temperature of the integrated circuit device based on the assessed differential.

12. The temperature sensor of claim 11, wherein the first temperature coefficient is a positive temperature coefficient and the second temperature coefficient is a negative temperature coefficient.

13. The temperature sensor of claim 11, wherein the absolute value of the first temperature coefficient is at least about 500 ppm/° C. and the absolute value of the second temperature coefficient is at most about 200 ppm/° C.

14. The temperature sensor of claim 11, wherein the first resistor stack and the second resistor stack are coupled in series between a voltage supply and a voltage ground.

15. The temperature sensor of claim 11, wherein the temperature sensor circuit includes an amplifier having an input and an output, and wherein the input of the amplifier is coupled to a node between the first resistor stack and the second resistor stack.

16. The temperature sensor of claim 15, wherein the temperature sensor circuit includes a feedback resistor stack, the feedback resistor stack being coupled to the output of the amplifier and to the node between the first resistor stack and the second resistor stack, and wherein the feedback resistor stack has the first temperature coefficient.

17. The temperature sensor of claim 16, wherein the amplifier is configured to output a voltage signal that corresponds to differentials between a resistance of the first resistor stack and a resistance of the second resistor stack, the output voltage signal being indicative of the temperature of the integrated circuit device.

18. A method for determining a temperature of an integrated circuit device, comprising:

assessing, by a temperature sensor circuit positioned in the integrated circuit device, a differential between a first voltage across a first resistor stack and a second voltage across a second resistor stack, wherein:
- the first resistor stack includes a plurality of metal layers separated by a plurality of electrically insulating layers, the metal layers being connected by vias through the electrically insulating layers, wherein the metal layers have a plurality of metal traces separated by electrically insulating material, the metal traces being interconnected at end portions of the metal traces, and wherein the first resistor stack has a first temperature coefficient; and
- the second resistor stack includes at least one metal layer connected to an upper metal layer of the first resistor stack by a via through an electrically insulating layer in the second resistor stack, wherein the second resistor stack has a second temperature coefficient, the first temperature coefficient having an absolute value higher than an absolute value of the second temperature coefficient;

providing, by the temperature sensor circuit, a voltage signal output corresponding to the assessed differential; and determining a temperature of the integrated circuit device based on the voltage signal output.

19. The method of claim 18, wherein the voltage signal output is output as a digital signal by the temperature sensor circuit.

20. The method of claim 19, further comprising applying one or more polynomials to the digital signal to determine the temperature of the integrated circuit device.

* * * * *